United States Patent [19]

Schlaikjer

[11] 4,056,663

[45] Nov. 1, 1977

[54] PERFORMANCE IN AN ORGANIC ELECTROLYTE

[75] Inventor: Carl Roger Schlaikjer, Arlington, Mass.

[73] Assignee: P. R. Mallory & Co. Inc., Indianapolis, Ind.

[21] Appl. No.: 628,036

[22] Filed: Nov. 3, 1975

[51] Int. Cl.$^2$ .............................................. H01M 6/16
[52] U.S. Cl. .................................... 429/197; 429/218
[58] Field of Search ................ 136/154, 155; 429/194, 429/197

[56] References Cited

U.S. PATENT DOCUMENTS

| 3,514,337 | 6/1970 | Braeuer et al. | 429/194 |
| 3,532,543 | 10/1970 | Nole et al. | 136/154 |
| 3,540,938 | 11/1970 | Gabano | 136/155 |
| 3,822,148 | 7/1974 | Dey et al. | 136/154 |
| 3,853,627 | 12/1974 | Lehmann et al. | 136/154 |
| 3,877,988 | 4/1975 | Dey et al. | 136/154 |

Primary Examiner—Donald L. Walton
Attorney, Agent, or Firm—Ronald S. Cornell; Israel Nissenbaum; Charles W. Hoffmann

[57] ABSTRACT

A high energy density electrochemical organic electrolyte solvent cell with highly oxidizing cathodes; the organic solvent being free of ethers and comprising a mixture of propylene and/or ethylene carbonate admixed with other specific carbonates and/or specific esters.

7 Claims, No Drawings

PERFORMANCE IN AN ORGANIC ELECTROLYTE

This invention relates to the field of organic electrolyte cells in which an active metal anode, a strong oxidizing depolarizer cathode and an electrolyte solution consisting of a salt of an active metal (such as a perchlorate, hexafluorophosphate, tetrafluoroborate or hexafluoroarsenate salt) is dissolved in an organic solvent. More particularly it relates to a new organic solvents system used in such a cell.

The increased use of active metals because of their high energy densities and low weights as anodes in electro-chemical cells has necessitated the employment of non-aqueous electrolyte solvents since active metals such as lithium, sodium, potassium, calcium, etc, which are above hydrogen in the EMF series, react with water and release hydrogen gas. Of the non-aqueous organic solvents used, tetrahydrofuran (THF) has previously been preferred because of its apparent involvement in some unknown catalytic mechanism during cathode discharge and also because without THF cathode efficiency is poor. In addition, when THF is mixed with propylene carbonate THF's low viscosity makes possible high conductivity and better low temperature performance. However, propylene carbonate alone or in any other prior art contemplated combination will not allow efficient discharge at low temperatures such as $-30°$ C.

A disadvantage of using tetrahydrofuran or ethers in general is the formation of peroxides. This is true especially in conjunction with highly oxidizing cathode materials such as $V_2O_5$, $MoO_3$, chromates, and dichromates of metals such as silver, mercury, copper, lead, iron, cobalt, nickel, titanium, bismuth and mixtures thereof or when exposed to molecular oxygen either from the atmosphere or from an oxygen-contaminated drybox atmosphere. These peroxides probably react with the active metal anode thereby forming passivating films. Also, ethers in general and tetrahydrofuran in particular are known to dissolve alkali metals. A sodium-potassium solution in tetrahydrofuran has been used in certain organic syntheses.

Tetrahydrofuran has also been found to be involved in the formation of inhibiting films on the surfaces of active metal anodes facing the cathodes. A result has been limited shelf life for cells evident when stored for 2 weeks at $55°$ C. These cells cannot subsequently be discharged efficiently at low temperatures such as at $-30°$ C.

It is an object of the present invention to provide novel electrolyte solvent systems which do not contain ethers and yet which compare favorably with tetrahydrofuran and have good low temperature performance and low chemical reactivities with the active metal anodes.

In accordance with the present invention an electrolyte solvent system comprising a mixture of carbonates or a combination of one or more carbonates together with one or more esters is used in place of tetrahydrofuran or other ethers in an active metal anode highly oxidizing cathode cell system. The carbonates used have high dielectric constants which property makes them useful as solvating agents which together with at least one adjuvant material which may be a carbonate having the general formula

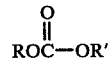

with R and R' each being an alkyl group having from 1-4 carbon atoms. Alternatively, the adjuvant material may be one or more esters such as methyl, ethyl, propyl, and butyl acetates, propionates, and n- and iso-butyrates. The adjuvant materials improve the low temperature performance of the polar carbonates. The relative percentages by volume of the polar carbonate with the adjuvant substances can be varied from 10:90 to 90:10 percent depending upon the desired operating temperature range, with more of the polar carbonate being desirable where the cells are to be used at higher temperatures and more of the adjuvant component for use at lower temperatures. The preferred range is from about 30:70 to about 70:30 percent, and most preferred is from about 1:2 to 5:7.

The following examples are given to further illustrate the invention.

EXAMPLE 1

A cell constructed with two flat platinum electrodes 3mm × 6mm and pyrex tabing was designed to measure the conductivity of solutions in long-necked volumetric flasks. Provisions were made to keep electrolytes dry and to ensure that the measurements were accurate. The conductivities were measured for 1 molar solutions of anhydrous lithium perchlorate ($LiClO_4$) as the electrolyte salt dissolved in a mixture of propylene carbonate and an adjuvant solvent chosen from methyl acetate, ethyl acetate, dimethyl carbonate, diethyl carbonate and methyl acetate. All conductivities were measured at ambient temperature and the ratio of propylene carbonate to the second solvent was varied as shown in Table 1:

TABLE 1

Conductivities, In $ohm^{-1}cm^{-1}$, Of One Molar $LiClO_4$ in Propylene Carbonate-Second Solvent Mixtures.

| Second Solvent | Temp. | Volume Ratio Propylene Second Solvent | Conductivity |
| --- | --- | --- | --- |
| Methyl acetate | 26.0° C | 5/7 | $1.15 \times 10^{-2}$ |
| Ethyl acetate | 22.5° C | 5/7 | $8.04 \times 10^{-3}$ |
| Dimethyl Carbonate | 25.0° C | 5/7 | $6.85 \times 10^{-3}$ |
| Diethyl Carbonate | 22.6° C | 5/7 | $3.98 \times 10^{-3}$ |
| Methyl acetate | 21.6° C | 1/2 | $1.02 \times 10^{-2}$ |

When ethylene carbonate was used in place of propylene carbonate in admixture with methyl acetate at a temperature of $28.4°$ C and in a volume ratio of 5 parts to 7 parts ethylene carbonate to methyl acetate the conductivity of the cell was $1.26 \times 10^{-3} ohm^{-1} cm^{-1}$.

In comparison, the conductivity of a prior art type of electrolyte system utilizing a one to one volume ratio of propylene carbonate and tetrahydrofuran tested at temperature of $24.3°$ C, was $8.78 \times 10^{-3} ohm^{-1} cm^{-1}$.

Thus it can be seen that the new solvent systems exhibit high conductivities without the use of ethers. Additionally, the reactivity of these electrolytes with the active metal anode is reduced by the combinations set forth above, when compared with electrolytes containing tetrahydrofuran.

EXAMPLE II

Replicate cells were constructed, in which methyl acetate-propylene carbonate, in a 7:5 volume ratio with 1 M lithium perchlorate, was compared at room temperature and at −30° C with a prior art type solvent system utilizing propylene carbonate (P.C.) and THF in a 1:1 volume ratio. Each cell contained a cathode measuring ⅞ × 1½ × 1/10 inches thick, in which a paste prepared from vanadium pentoxide (69 w/o), graphite, and binders had been pressed on to an appropriate metal screen. Each cathode contained approximately 2.63g of vanadium pentoxide, or 1.55 amp hours, assuming four equivalents per mole of $V_2O_5$. Each cell contained two anodes, in which Li foil measuring ⅞ × 1½ × 0.015 inches was pressed on to each of two screens. These were positioned on either side of the cathodes. Polypropylene fabric separators and polyethylene containers completed the cells. Each held 5-8 ml of electrolyte. The results are set forth in Table II.

TABLE II

| Discharge Temperature | Discharge Rate | Hours to 2.5V | To 2V | To 1.5V | Solvent System |
|---|---|---|---|---|---|
| Room | 1 ma/cm$^2$ | 23.5 | 40 | 66 | MeOAc:P.C. |
| Room | 1 ma/cm$^2$ | 24.0 | 40 | 67.5 | MeOAc:P.C. |
| Room | 1 ma/cm$^2$ | 23.0 | 43.5 | 68.0 | THF:P.C. |
| Room | 1 ma/cm$^2$ | 24.0 | 43.5 | 67.0 | THF:P.C. |
| −30° C | 0.5 ma/cm$^2$ | 28.0 | 62.5 | 99 | MeOAc:P.C. |
| −30°C | 0.5 ma/cm$^2$ | 30.5 | 67.5 | 100 | MeOAc:P.C. |
| −30° C | 0.5 ma/cm$^2$ | 29.0 | 65 | 91.6 | THF:P.C. |
| −30° C | 0.5 ma/cm$^2$ | 29.5 | 65 | 94.2 | THF:P.C. |

The performance of cells using the electrolyte solvent system of this invention is comparable to or better than cells using conventional electrolyte systems. The efficiency of cathode discharge is thus maintained although no ether, together with its disadvantages, is present.

What is claimed is:

1. An electrochemical cell comprising an active metal anode, said active metal being above hydrogen in the EMF series; a salt of an active metal as electrolyte; an oxidizing cathode selected from the group consisting of $V_2O_5$, $MoO_3$, the chromates and dichromates of silver, mercury, copper, lead, iron, cobalt, nickel, thallium, bismuth and mixtures thereof; and an ether free electrolyte solvent system comprising a mixture of a polar material selected from the group consisting of propylene carbonate, ethylene carbonate and mixtures thereof with an adjuvant material selected from the group consisting of methyl acetate, ethyl acetate, propyl acetate, butyl acetate and mixtures thereof.

2. A cell according to claim 1 wherein said active metal anode is Li.

3. A cell according to claim 1 wherein said salt is lithium perchlorate.

4. A cell according to claim 1 wherein said adjuvant material is selected from the group consisting of methyl acetate, ethyl acetate and mixtures thereof.

5. A cell according to claim 1 wherein the ratio of said polar material to said adjuvant material is from 10:90 to 90:10 volume percent.

6. A cell according to claim 1 wherein the ratio of said polar material to said adjuvant material is from 1:2 to 5:7 by volume.

7. A cell according to claim 1 wherein said organic electrolyte solvent system is an ether free system containing propylene carbonate and methyl acetate in a ratio of 1:2 by volume.

* * * * *